(12) United States Patent
Kim et al.

(10) Patent No.: US 9,423,294 B2
(45) Date of Patent: Aug. 23, 2016

(54) DISPLAY DEVICE AND OPTICAL INPUTTING DEVICE WITH RETARDERS

(71) Applicant: Samsung Display Co., Ltd., Yongin, Gyeonggi-do (KR)

(72) Inventors: Kwang-Hyun Kim, Gunpo-si (KR); Seung Beom Park, Seoul (KR); Min Su Kim, Seoul (KR); Ji-Hoon Kim, Hwaseong-si (KR); Na Young Shin, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 496 days.

(21) Appl. No.: 13/705,716

(22) Filed: Dec. 5, 2012

(65) Prior Publication Data
US 2013/0313416 A1 Nov. 28, 2013

(30) Foreign Application Priority Data

May 25, 2012 (KR) .................. 10-2012-0055982

(51) Int. Cl.
| | |
|---|---|
| *G02F 1/01* | (2006.01) |
| *H01J 5/16* | (2006.01) |
| *G01J 1/04* | (2006.01) |
| *F21V 9/14* | (2006.01) |
| *G02F 1/1333* | (2006.01) |
| *G06F 3/03* | (2006.01) |
| *G02F 1/13363* | (2006.01) |

(52) U.S. Cl.
CPC .............. *G01J 1/0429* (2013.01); *F21V 9/14* (2013.01); *G02F 1/13338* (2013.01); *G06F 3/03* (2013.01); *G02F 2001/133638* (2013.01)

(58) Field of Classification Search
CPC .................................................. G06F 3/03547
USPC ............... 250/549, 221, 216, 227.14–227.24; 345/173–183; 341/5; 178/18.09
See application file for complete search history.

(56) References Cited

U.S. PATENT DOCUMENTS

| | | | |
|---|---|---|---|
| 4,272,676 A | * | 6/1981 | Dieulesaint et al. .......... 250/221 |
| 7,602,380 B2 | | 10/2009 | Yoshida et al. |
| 7,777,727 B2 | | 8/2010 | Cha et al. |
| 2007/0091045 A1 | * | 4/2007 | Hisatake .............. G09G 3/3607 345/88 |
| 2008/0283731 A1 | | 11/2008 | Karman |
| 2009/0073116 A1 | | 3/2009 | Horiuchi et al. |
| 2010/0149135 A1 | | 6/2010 | Park et al. |
| 2010/0283764 A1 | * | 11/2010 | Miyazaki et al. ............. 345/175 |
| 2011/0241989 A1 | | 10/2011 | Park et al. |
| 2012/0275133 A1 | * | 11/2012 | Chang et al. ..................... 362/19 |
| 2013/0063684 A1 | * | 3/2013 | Chen ................... G02F 1/13338 349/96 |

FOREIGN PATENT DOCUMENTS

| | | |
|---|---|---|
| JP | 11085395 A | 3/1999 |
| JP | 2005148560 A | 6/2005 |
| JP | 2006268297 A | 10/2006 |

(Continued)

*Primary Examiner* — Pascal M Bui Pho
(74) *Attorney, Agent, or Firm* — Cantor Colburn LLP

(57) ABSTRACT

A display device includes an upper substrate, a lower substrate disposed opposite to the upper substrate, a photosensor disposed between the upper substrate and the lower substrate, a polarizer disposed on the upper substrate, and a retarder disposed on the polarizer, where light of elliptical polarization from outside is converted by a λ/4 phase difference, and transmitted to the photosensor sequentially through the retarder and the polarizer.

6 Claims, 7 Drawing Sheets

(56) References Cited

FOREIGN PATENT DOCUMENTS

| | | |
|---|---|---|
| JP | 2006293934 A | 10/2006 |
| JP | 2011123580 A | 6/2011 |
| KR | 1020010026856 A | 4/2001 |
| KR | 1020050054376 A | 6/2005 |
| KR | 1020090023657 A | 3/2009 |
| KR | 1020100008988 A | 1/2010 |
| KR | 1020100112379 A | 10/2010 |
| KR | 1020100120456 A | 11/2010 |
| KR | 1020110009290 A | 1/2011 |
| KR | 20110121621 | 11/2011 |
| KR | 1020110123116 A | 11/2011 |

* cited by examiner $$\vec{E}(z,t) = \vec{E}_x(z,t) + \vec{E}_y(z,t)$$

$$\vec{E}_x(z,t) = \hat{i}E_{0x}\cos(kz-wt)$$

$$\vec{E}_y(z,t) = \hat{j}E_{0y}\cos(kz-wt+\delta)$$

DISPLAY DEVICE AND OPTICAL INPUTTING DEVICE WITH RETARDERS

This application claims priority to Korean Patent Application No. 10-2012-0055982 filed on May 25, 2012, and all the benefits accruing therefrom under 35 U.S.C. §119, the content of which in its entirety is herein incorporated by reference.

BACKGROUND (a) Field

Exemplary embodiments of the invention relate to a display device and an optical inputting device.

(b) Description of the Related Art

Display devices have been increased in size through development of liquid crystal panels and plasma display panels. Such display devices are thin and lightweight relative to the large size thereof such that they may be easily installed. The display device, which is thin and lightweight, may be used in various fields such as advertising, education and promotion.

When using the display device, a user may provide pointing information through an image using a laser pointer to instruct or select contents from the output image of the display device. The laser pointer typically provides the pointing information by irradiating a laser beam to the image of the display device.

In the display device, a polarizer is typically provided to control light incident to a display area, and as the polarizer is typically positioned between a photosensor in the display device and an external optical inputting device, light sensing of the photosensor may be deteriorated according to how the user using the optical inputting device grasps the optical inputting device.

SUMMARY

Exemplary embodiments of the invention provide a display device which uniformly maintains a sensing degree of a photosensor independently from a grip angle of an optical inputting device by a user.

An exemplary embodiment of a display device according to the invention includes an upper substrate, a lower substrate disposed opposite to the upper substrate, a photosensor disposed between the upper substrate and the lower substrate, a polarizer disposed on the upper substrate, and a retarder disposed on the polarizer, where light of elliptical polarization from outside is converted by a $\lambda/4$ phase difference, and transmitted to the photosensor sequentially through the retarder and the polarizer.

In an exemplary embodiment, the retarder may include a $\lambda/4$ retarder.

In an exemplary embodiment, an azimuth angle between a phase axis of the retarder and a transmissive axis of the polarizer may be in a range from about 22.5 degrees to about 57.5 degrees.

An exemplary embodiment of an optical inputting device according to the invention includes a light source which generates elliptically polarized light, and a retarder which shifts a phase of the elliptically polarized light by about $\lambda/4$.

In an exemplary embodiment, the light source may include a photo pointer of a diode type.

In an exemplary embodiment, the retarder may be disposed at a light emitting portion of the light source.

In an exemplary embodiment, the retarder may include a variable retarder.

In an exemplary embodiment, the elliptically polarized light may have a phase value $\delta$, and the variable retarder may have a phase difference of $(\lambda/4)-\delta$.

In an exemplary embodiment, the variable retarder may be detachably attached to the light source.

An alternative exemplary embodiment of a display device according to the invention includes an upper substrate, a lower substrate disposed opposite to the upper substrate, a photosensor disposed between the upper substrate and the lower substrate, a polarizer disposed on the upper substrate, a first retarder disposed on the polarizer, an optical inputting device which generates light to be incident to the first retarder and the polarizer, and a second retarder disposed between the optical inputting device and the first retarder, where light generated from the optical inputting device is transmitted to the photosensor sequentially through the second retarder, the first retarder and the polarizer.

In an exemplary embodiment, each of the first retarder and the second retarder may include a $\lambda/4$ retarder.

In an exemplary embodiment, the optical inputting device may be rotated with respect to a rotation axis corresponding to a direction in which the light generated from the optical inputting device progresses.

In an exemplary embodiment, an angle between a phase axis of the first retarder and a phase axis of the second retarder may be in a range from about 45 degrees to about 135 degrees.

In an exemplary embodiment, the second retarder may include a variable retarder.

In an exemplary embodiment, the optical inputting device may generate elliptically polarized light having a phase value $\delta$, and the variable retarder may have a phase difference of $(\lambda/4)-\delta$.

In an exemplary embodiment, the variable retarder may convert the elliptically polarized light generated from the optical inputting device into circularly polarized light.

According to one or more exemplary embodiment of the invention, the retarder is disposed between the external optical inputting device and the photosensor such that the amount of light passing through the polarizer is substantially uniform when the input polarization generated by the optical inputting device rotates by the rotation of the optical inputting device.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
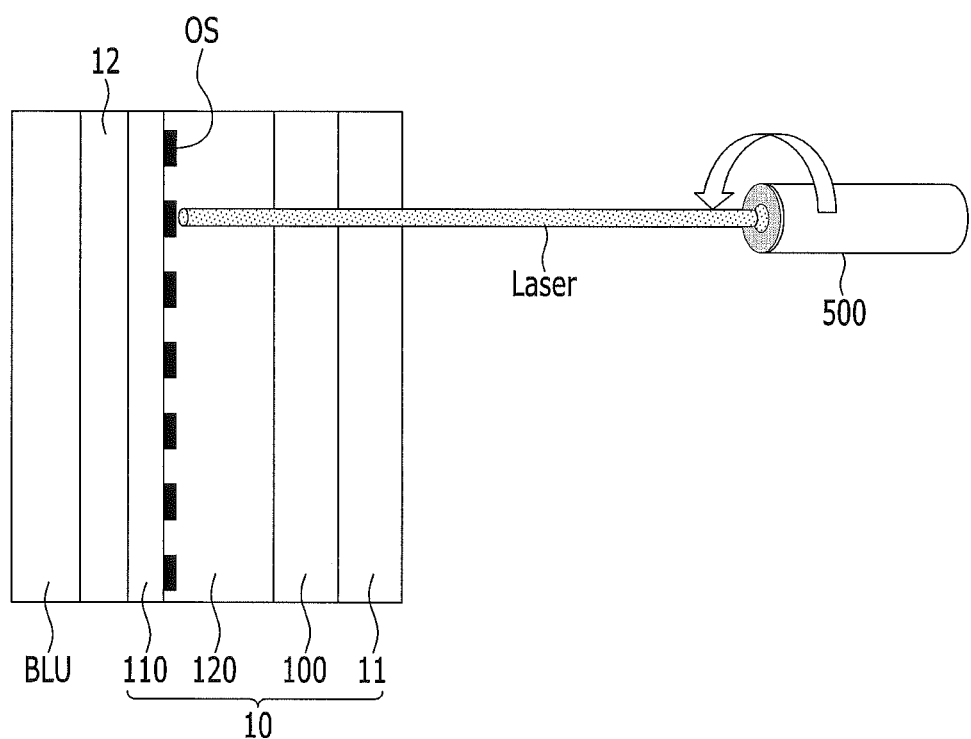
FIG. 1 is a schematic view of an exemplary embodiment of a display device including a photosensor which receives light through an optical inputting device.

The invention will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

Figure 2:
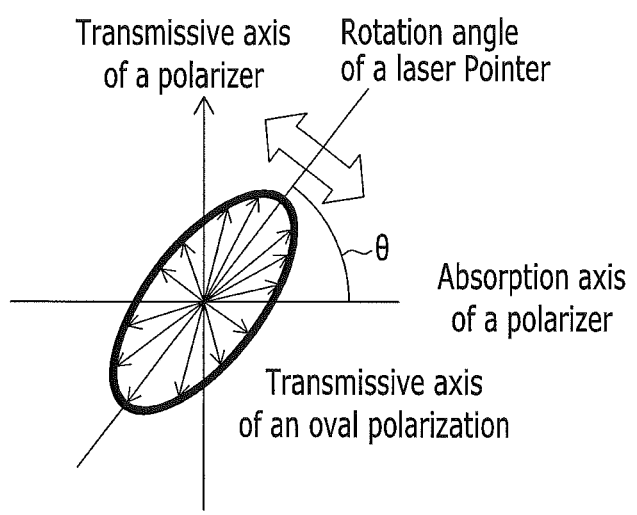
FIG. 2 is a graph showing a polarization state of light according to a transmissive axis and an absorption axis of the polarizer in FIG. 1.

FIG. 1 is a schematic view of an exemplary embodiment of a display device 10 including a photosensor which receives light through an optical inputting device. FIG. 2 is a graph showing a polarization state of light according to a transmissive axis and an absorption axis of the polarizer in FIG. 1.

Referring to FIG. 1, the display device 10 includes a lower substrate 110 including a photosensor OS, an optical display unit 120 positioned on the lower substrate 110 and an upper substrate 100 positioned at a surface thereof facing an optical inputting device 500. The display device 10 includes an upper polarizer 11 disposed, e.g., attached, on a surface of the upper substrate 100, which faces the optical inputting device 500.

In an exemplary embodiment, where the display device 10 is a liquid crystal display, module constitutions of the liquid crystal display, such as a thin film transistor, a pixel electrode, a color filter and a liquid crystal layer, for example, may be provided in the optical display unit 120. In such an embodiment, the lower substrate 110 is disposed at a portion facing the upper substrate 100, a lower polarizer 12 may be disposed under the lower substrate 110, and a backlight unit BLU may be disposed under the polarizer 12.

The photosensor OS senses light generated from the optical inputting device 500 such that an item, e.g., an icon and a menu, among images expressed by the display device 10 may be selected or a writing function may be performed by an afterimage according to a moving position of pointing information.

When performing a conference, where the user irradiates a laser toward the optical display unit 120 using the optical inputting device 500, the laser is sensed in the photosensor OS such that input information is shown at a screen of the optical display unit 120.

Referring to FIG. 2, a transmissive axis of the upper polarizer 11 attached to the upper substrate 100 is aligned in a transverse direction, and an absorption axis of the upper polarizer 11 is aligned in a longitudinal direction. In an exemplary embodiment, the optical inputting device 500 may include a light source using a diode method, and a cross-section of a vibration trajectory may have an elliptical polarization component. In an exemplary embodiment, as shown in FIG. 2, when a longitudinal axis of the elliptical polarization of the optical inputting device 500 and the absorption axis of the upper polarizer 11 form an angle θ, θ may be defined by a rotation angle of the optical inputting device 500.

Figure 3:
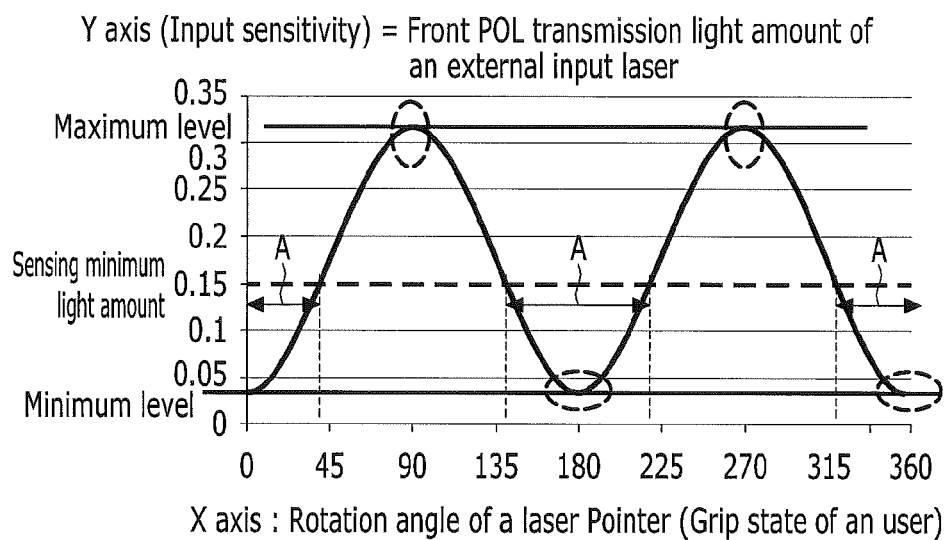
FIG. 3 is a graph schematically showing input sensitivity according to a rotation angle of the optical inputting device of FIG. 1 and FIG. 2.

FIG. 3 is a graph schematically showing input sensitivity according to a rotation angle of the optical inputting device of FIG. 1 and FIG. 2.

Referring to FIG. 3, an amount of light that the laser transmits to the upper polarizer 11 when the rotation angle θ of the optical inputting device 500 is changed from zero (0) degree to 360 degrees is shown. In FIG. 3, the total amount of light which the optical inputting device 500 generates is defined as one. When the rotation angle θ of the optical inputting device 500 is about 90 degrees and about 270 degrees, the longitudinal axis of the elliptical polarization is substantially parallel to the transmissive axis of the upper polarizer 11 such that the amount of light passed through the upper polarizer 11 may have a maximum value greater than about 0.3. When the rotation angle θ of the optical inputting device 500 is about 180 degrees and about 360 degrees, the longitudinal axis of the elliptical polarization is substantially perpendicular to the transmissive axis of the upper polarizer 11 such that the amount of light passed through the upper polarizer 11 may have a minimum value less than about 0.05.

As described, when the laser is incident to the optical display unit 120 from outside in the elliptical polarization state, the light that vibrates in a direction substantially parallel to the transmissive axis of the upper polarizer 11 is transmitted and reaches the photosensor OS, and the light that vibrates in the direction substantially perpendicular to the transmissive axis is blocked by the upper polarizer 11. Accordingly, a period A when an input amount is not sufficient exists according to a grip state (a state of grasping the optical inputting device) of the user using the optical inputting device 500, as shown in the graph of FIG. 3, such that the sensor may not effectively sense the light from the optical imputing device 500.

The output of the optical inputting device may be physically increased and the sensitivity of the sensor may be improved. However, the aperture ratio may be decreased due to an increase of an area of the sensor unit to form a high sensitivity sensor inside the display device, and interference with a pixel signal may occur. Also, standards of commercial products may not be substantially uniform such that the output of the optical inputting device to a predetermined degree may not be substantially uniformly maintained.

According to an exemplary embodiment of the invention, a phase difference optical system is provided between the optical inputting device and the display device such that the amount of light provided to the photosensor OS becomes greater than a predetermined value independently from the grip state of the user of the optical inputting device. Exemplary embodiments including the phase difference optical system will be described in detail with reference to FIG. 4 to FIG. 7.

Figure 4:
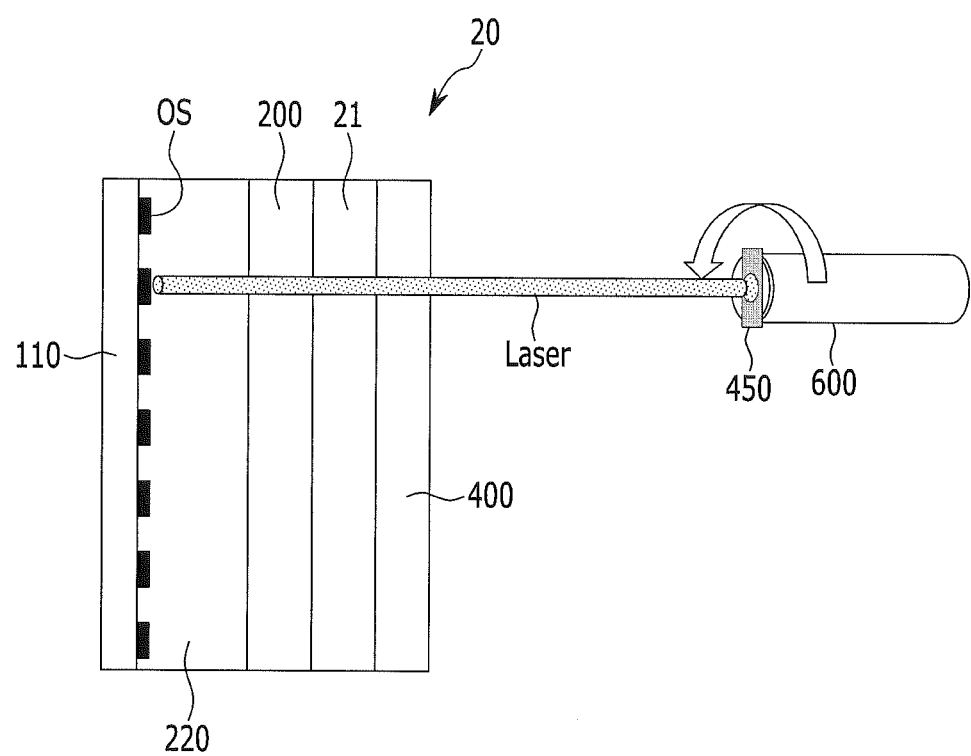
FIG. 4 is a schematic view of an exemplary embodiment of a display device and an optical inputting device according to the invention.
Figure 5:
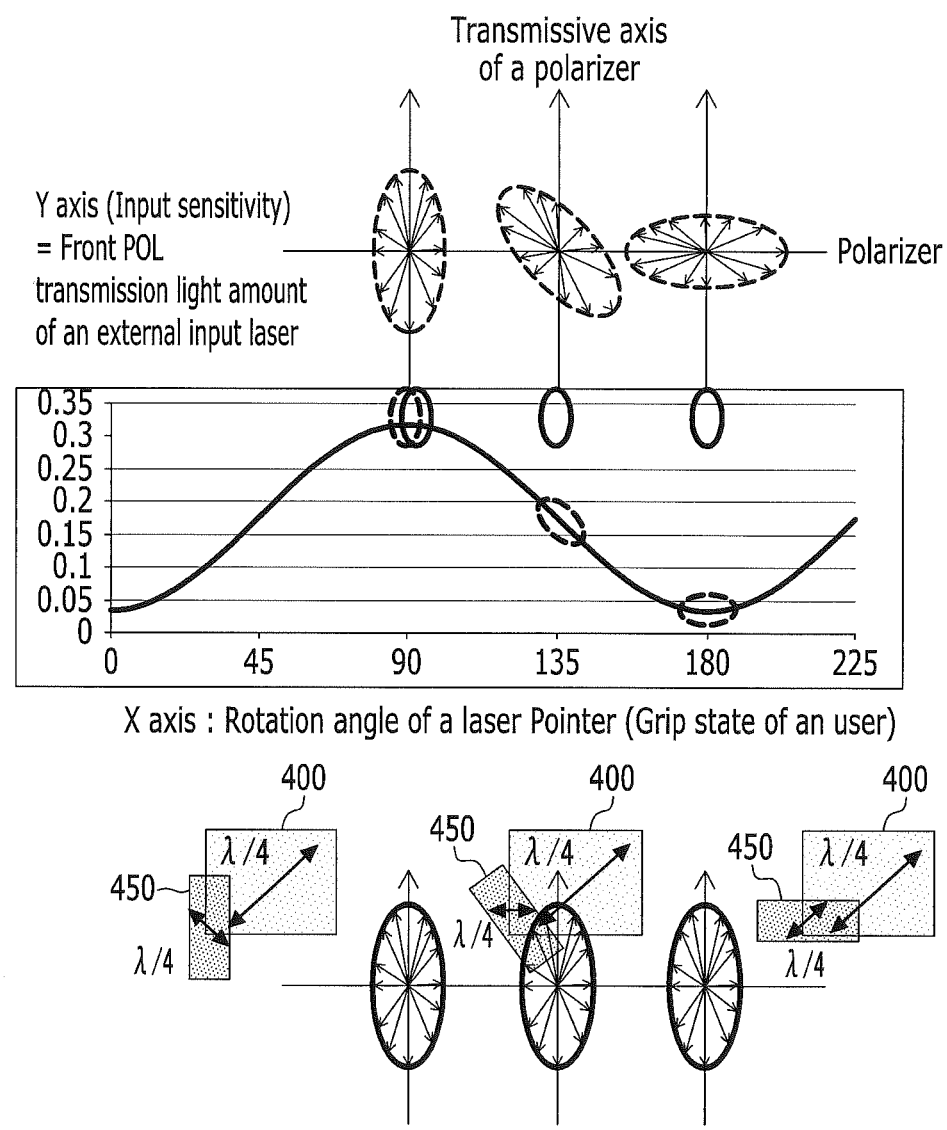
FIG. 5 is a graph showing a polarization state according to a rotation angle of an optical inputting device in FIG. 4.

FIG. 4 is a schematic view of an exemplary embodiment of a display device and an optical inputting device according to the invention. FIG. 5 is a graph showing a polarization state according to a rotation angle of an optical inputting device in FIG. 4.

Referring to FIG. 4, an exemplary embodiment of a display device 20 includes an optical display unit 220, a photosensor OS and an upper substrate 200 positioned at a surface of the optical display unit 220 facing an optical inputting device 600. A polarizer 21 is attached on one surface of the upper substrate 200 facing the optical inputting device 600. In an exemplary embodiment, the display device 20 further include a first retarder 400 disposed on the polarizer 21 and which effectively prevents a decrease in the amount of light passing therethrough according to the rotation angle of the optical inputting device 600. In an exemplary embodiment, the first retarder 400 may be a λ/4 retarder, for example.

In an exemplary embodiment, as shown in FIG. 4, the photosensor OS is disposed directly on the lower substrate 110. In an alternative exemplary embodiment, the photosensor OS may be disposed between the upper substrate 200 and the lower substrate 110 on the upper substrate 200. In another alternative exemplary embodiment, the photosensor OS may be disposed at a separate layer.

In an exemplary embodiment, where the display device 20 includes a liquid crystal display, module constitutions of the liquid crystal display, such as a thin film transistor, a pixel electrode, a color filter and a liquid crystal layer, for example, may be provided in the optical display unit 220.

In an exemplary embodiment, as shown in FIG. 4, the phase of the elliptically polarized light generated outside is shifted by about λ/4 (about 90 degrees) when the light is received by the photosensor OS through the first retarder 400 and the polarizer 21. In such an embodiment, the phase of the elliptically polarized light is shifted by about λ/4 (about 90 degrees) when the light is passed through the first retarder 400 and the polarizer 21, the amount of light transmitted to the photosensor OS may be maintained at a level greater than or equal to a predetermined level. In FIG. 4, an exemplary embodiment where the phase of the elliptically polarized light is shifted by about λ/4 (about 90 degrees) is shown when the optical inputting device 600 that emits the elliptically polarized light is applied. Hereinafter, the optical inputting device 600 will be described.

In an exemplary embodiment, the optical inputting device 600 emits the elliptically polarized light, and the elliptically polarized light is passing through the second retarder such that the phase of the elliptically polarized light is shifted by about λ/4 (about 90 degrees). In such an embodiment, a second retarder 450 may be disposed at a portion where the light is emitted from the optical inputting device 600. In an exemplary embodiment, the second retarder 450 may be a λ/4 retarder. The optical inputting device 600 may include a photo pointer of a diode type as the light source thereof. In an exemplary embodiment, the second retarder 450 may be detachably attached to the portion where the light is emitted from the optical inputting device 600.

In an exemplary embodiment, a phase axis angle between the first retarder 400 and the second retarder 450 may be about 45 degrees to about 135 degrees. In such an embodiment, the phase axis of the first retarder 400 and the transmissive axis of the polarizer 21 may be determined with reference to an azimuth angle of about 45 degrees. In an exemplary embodiment, for example, the phase axis angle between the first retarder 400 and the second retarder 450 may be in a range from about 45 degrees to about 135 degrees, and the transmissive axis of the first retarder 400 and the polarizer 21 may have the azimuth angle from about 22.5 degrees to about 57.5 degrees.

The first retarder 400 is disposed on the polarizer 21 and may be disposed on, e.g., fixed to, the optical display unit 220. The second retarder 450 is rotated together according to the rotation of the optical inputting device 600 by the user.

FIG. 5 shows the amount of light that the laser transmits through the polarizer 21 according to the change of the rotation angle (θ) of the optical inputting device 600 from zero (0) degree to 360 degrees. In FIG. 5, the total amount of light which the optical inputting device 600 generates is defined as 1. In FIG. 5, the elliptical polarization indicated by the dotted line represents the change according to the rotation angle (θ) of the optical inputting device 600 when the first and second retarders 400 and 450 are not provided. As described above with reference to FIG. 3, in an embodiment where the first and second retarders 400 and 450 are not provided to the optical inputting device 600, the rotation angle (θ) is about 90 degrees and about 270 degrees, and the amount of light passing through the polarizer 21 has the maximum value greater than about 0.3; however, when the rotation angle (θ) of the optical inputting device 500 is about 180 degrees and about 360 degrees, the amount of light passing through the polarizer 21 has the minimum value less than about 0.05 such that the photosensor OS may not effectively sense the light input thereto.

In an exemplary embodiment, where the first and second retarders 400 and 450 are provided, when the optical inputting device 600 is rotated by the user, the amount of light transmitted to the photosensor OS is substantially uniform such that the amount of light reaching the photosensor OS may be maintained at a level greater than a predetermined level that allows the photosensor to effectively senses the light. The amount of light reaching the photosensor OS where the first and second retarders 400 and 450 are provided will be described in greater detail with reference to FIG. 5.

Referring to a lower left portion of the graph of FIG. 5, when the rotation angle is about 90 degrees, the first retarder 400 positioned on the polarizer 21 forms the angle of about 45 degrees with the transmissive axis of the polarizer 21, and the second retarder 450 forms the angle of about 135 degrees with the transmissive axis of the polarizer 21. When the rotation angle is about 90 degrees, the first retarder 400 and the second retarder about 450 form the angle of about 90 degrees such that the effect according to the retarder is offset. The laser generated from the optical inputting device 600 is sequentially passing through the second retarder 450 and the first retarder 400 and then is incident to the polarizer 21, and here, the elliptical shape, in which the longitudinal axis of the elliptical polarization is substantially parallel to the transmissive axis, is incident to the polarizer 21 by the retarder offset effect.

Referring to a lower right portion of the graph of FIG. 5, when the rotation angle is about 180 degrees, the first retarder 400 positioned on the polarizer 21 forms the angle of about 45 degrees with the transmissive axis of the polarizer 21, and the second retarder 450 is rotated along with the optical inputting device 600 thereby forming the angle of about 45 degrees by the transmissive axis of the polarizer 21. When the rotation angle is about 180 degrees, the first retarder 400 and the second retarder 450 form about 180 degrees such that the phase is shifted by λ/2. According to the rotation of the optical inputting device 600, the longitudinal axis of the elliptical polarization, which is inclined to be substantially perpendicular to the transmissive axis of the polarizer 21, is changed to be substantially parallel to the transmissive axis of the polarizer 21 after passing through the first and second retarders 400 and 450. Accordingly, the elliptical shape in which the longitudinal axis of the elliptical polarization is substantially parallel to the transmissive axis is incident to the polarizer 21 as the longitudinal axis of the elliptical polarization when the rotation angle is about 90 degrees.

Referring to a lower middle portion of the graph of FIG. 5, when the rotation angle is about 135 degrees, the first retarder 400 positioned on the polarizer 21 forms the angle of about 45 degrees with the transmissive axis of the polarizer 21, and the second retarder 450 forms the angle of about 180 degrees by the transmissive axis of the polarizer 21 according to the rotation of the optical inputting device 600. When the rotation angle is about 135 degrees, because the first retarder 400 and the second retarder 450 form the angle of about 135 degrees, the effect of rotating the phase is generated by the angle at which the longitudinal axis of elliptical polarization is rotated. Accordingly, the elliptical shape in which the longitudinal axis of the elliptical polarization is substantially parallel to the transmissive axis is incident to the polarizer 21 as the longitudinal axis of the elliptical polarization when the rotation angle is about 90 degrees.

As described above, according to an exemplary embodiment, the external light incident to the optical display unit 220 reaches the photosensor OS without the loss of the light amount by the first and second retarders 400 and 450 when the optical inputting device 600 is rotated by the user such that the input sensitivity is substantially improved.

Figure 6:
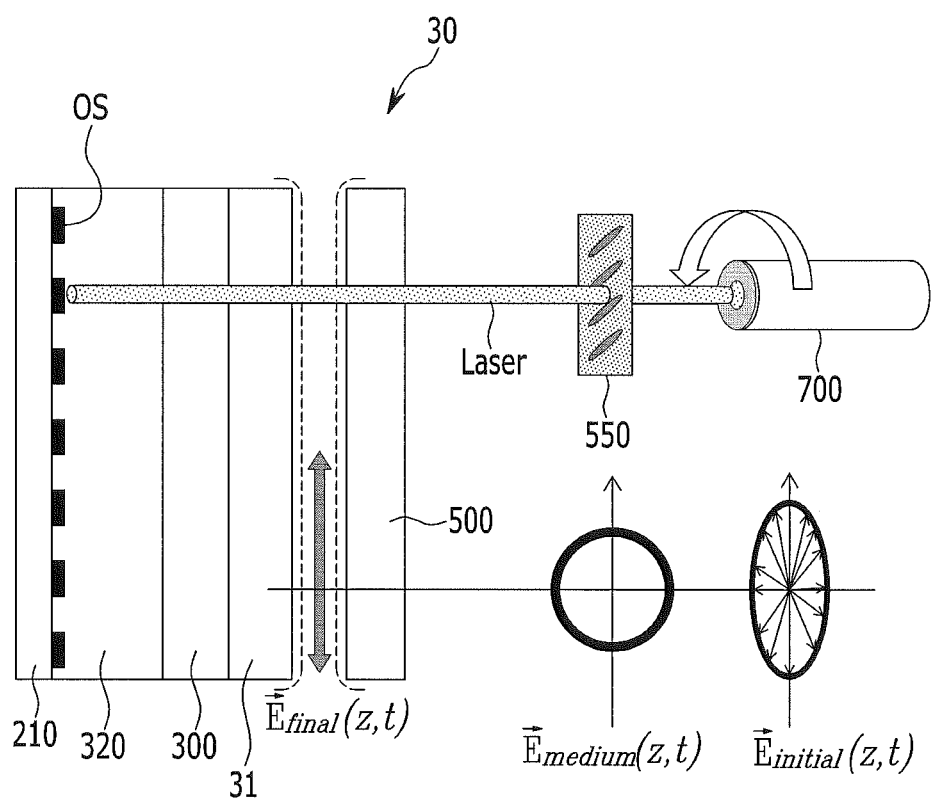
FIG. 6 is a schematic view of an alternative exemplary embodiment of a display device and an optical inputting device according to the invention.

FIG. 6 shows an alternative exemplary embodiment of a display device and an optical inputting device according to the invention.

Referring to FIG. 6, an exemplary embodiment of a display device 30 includes a lower substrate 210, an optical display unit 320, a photosensor OS and an upper substrate 300 disposed at the surface thereof facing an optical inputting device 700. In an exemplary embodiment, as shown in FIG. 6, the photosensor OS is disposed directly on the lower substrate 210. In an alternative exemplary embodiment, the photosensor OS may be disposed between the upper substrate 300 and the lower substrate 210 on the upper substrate 300. In another alternative exemplary embodiment, the photosensor OS may be disposed at a separate layer.

The display device 30 further includes a polarizer 31 disposed, e.g., attached, on one surface of the upper substrate 300 facing the optical inputting device 700. In an exemplary embodiment, a first retarder 500, which may be the λ/4 retarder, is disposed on the polarizer 31 to effectively prevent the reduction of the amount of light according to the rotation angle of the optical inputting device 700. The display device 30 in FIG. 6 is substantially the same as the display device 20 in FIG. 4, except that the second retarder. In an exemplary embodiment, as shown in FIG. 6, a second retarder 550 is a variable retarder and disposed between the first retarder 500 and the optical inputting device 700.

The second retarder 550 may shift light by a phase difference of (λ/4)−δ as the variable retarder. Here, λ denotes a unit wavelength generated in the optical inputting device 700, and δ denotes a phase difference between a linear polarization and the elliptical polarization for a wave function of the light emitted from the optical inputting device 700.

The second retarder 550, which is the variable retarder, may include two opposing substrates having electrodes and liquid crystal molecules disposed between the two opposing substrates. In such an embodiment, the second retarder 550 may be turned on or off based on the alignment of the liquid crystal molecules by the electrodes of the two opposing substrates. In an exemplary embodiment, the second retarder 550 may be detachably attached to the optical inputting device 700.

The laser generated from the optical inputting device 700 has the elliptical polarization state, as shown in the graph displayed at the lower right portion of FIG. 6. The elliptically polarized light is converted into the circularly polarized light after passing through the second retarder 550. The circularly polarized light is converted into the linearly polarized light after passing through the first retarder 500. Accordingly, the linearly polarized light is incident to the optical display unit 320 and to the photosensor OS such that the light efficiency is substantially increased or effectively maximized. Hereinafter, the polarization according to the light position will be described in detail with reference to FIG. 7.

Figure 7:
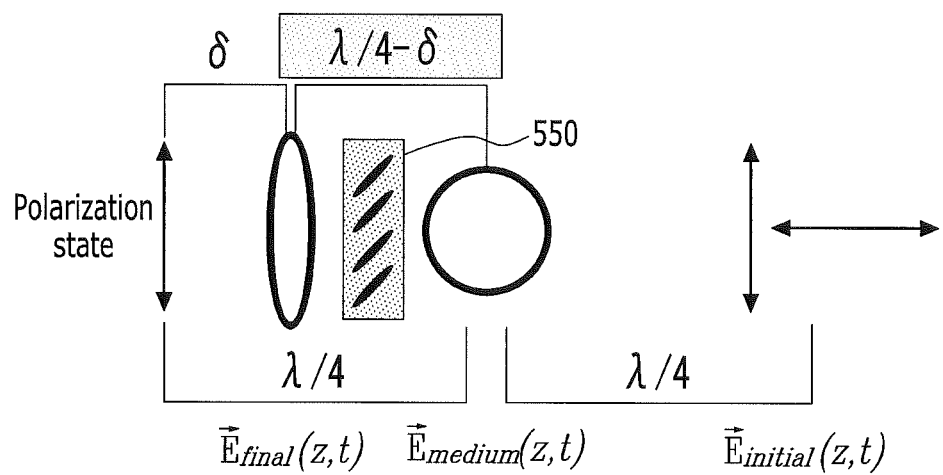
FIG. 7 is a schematic view illustrating a polarization state according to a position of light generated in the optical inputting device in FIG. 6.

FIG. 7 is a schematic view showing a polarization state according to a position of light generated in the optical inputting device in FIG. 6. Here, the light is progressed in a z-axis direction.

Referring to FIG. 6 and FIG. 7, when the wave function corresponding to the light emitted from the optical inputting device is expressed by the elliptical polarization having the phase difference δ from the linear polarization and the variable retarder 550 has the phase difference of (λ/4)–δ, the wave function $E_{medium}(z, t)$ of the light after passing through the second retarder 550 may be in the circular polarization. When the first retarder 500 disposed on the polarizer 31 is the λ/4 retarder, the light incident is converted into linearly polarized light, which is substantially parallel to the transmissive axis of the polarizer 31, such that the amount of light obtained by the transmission of the linear polarization is greater than a predetermined level and substantially uniformly transmitted to the photosensor OS independently from the rotation angle of the optical inputting device 700.

Exemplary embodiments of the display device including the polarizer disposed at the direction that the light of the external optical inputting device is incident may be applied to various display devices such as a liquid crystal display, an organic light emitting device and a plasma display device, for example.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   an upper substrate;
   a lower substrate disposed opposite to the upper substrate;
   a photosensor disposed between the upper substrate and the lower substrate;
   a polarizer disposed on the upper substrate;
   a second retarder facing the polarizer; and
   a first retarder disposed between the polarizer and the second retarder,
   wherein light of elliptical polarization from outside is transmitted to the photosensor sequentially first through the second retarder, then the first retarder and then thirdly through the polarizer,
   wherein the first retarder and the second retarder comprise a λ/4 retarder,
   a longitudinal axis of the elliptically polarized light transmitted through the second retarder and then the first retarder substantially corresponding with a transmissive axis of the polarizer, and
   the elliptical polarization of the light from the outside reaches the photosensor with a substantially same amount of light regardless of the rotation angle of the longitudinal axis of the elliptical polarization of the light from the outside.

2. The display device of claim 1, wherein
   an azimuth angle between a phase axis of the retarder and the transmissive axis of the polarizer is in a range from about 22.5 degrees to about 57.5 degrees.

3. A display device comprising:
   an upper substrate;
   a lower substrate disposed opposite to the upper substrate;
   a photosensor disposed between the upper substrate and the lower substrate;
   a polarizer disposed on the upper substrate;
   a first retarder disposed on the polarizer;
   an optical inputting device which generates elliptically polarized light to be incident to the first retarder and the polarizer; and
   a second retarder disposed between the optical inputting device and the first retarder,
   wherein the first retarder comprises a λ/4 retarder,
   wherein light generated from the optical inputting device is transmitted to the photosensor sequentially first through the second retarder, then the first retarder and then thirdly through the polarizer,
   wherein the second retarder comprises a variable retarder, and
   wherein the variable retarder converts the elliptically polarized light generated from the optical inputting device into circularly polarized light.

4. The display device of claim 3, wherein
   the optical inputting device is rotated with respect to a rotation axis corresponding to a direction in which the light generated from the optical inputting device progresses.

5. The display device of claim 4, wherein
   an angle between a phase axis of the first retarder and a phase axis of the second retarder is in a range between about 45 degrees and about 135 degrees.

6. The display device of claim 3, wherein
   the optical inputting device generates the elliptically polarized light having a phase value δ, and
   the variable retarder has a phase difference of (λ/4)–δ.

* * * * *